United States Patent

Jun

Patent Number: 6,025,883
Date of Patent: Feb. 15, 2000

[54] RESOLUTION CONVERSION APPARATUS AND METHOD FOR A DISPLAY DEVICE

[75] Inventor: Sung-Gon Jun, Kyunggi-do, Rep. of Korea

[73] Assignee: SamSung Electronics Co., Ltd., Kyungki-do, Rep. of Korea

[21] Appl. No.: 08/951,973

[22] Filed: Oct. 16, 1997

[30] Foreign Application Priority Data

Oct. 16, 1996 [KR] Rep. of Korea .................. 96-46292

[51] Int. Cl.$^7$ ..................... H04N 7/01; H04N 11/20
[52] U.S. Cl. ..................... 348/458; 348/451; 348/441
[58] Field of Search .................. 348/441, 458, 348/459, 445, 446, 448, 556, 913; H04N 7/01, 11/20

[56] References Cited

U.S. PATENT DOCUMENTS 3,742,135  6/1973  Baldwin .
3,830,971  8/1974  Van de Polder .
3,970,776  7/1976  Kinuhata et al. .
5,386,236  1/1995  Hong ........................ 348/445
5,485,217  1/1996  Park ......................... 348/445
5,517,588  5/1996  Kondo ....................... 348/445
5,534,936  7/1996  Kim ......................... 348/448
5,793,433  8/1998  Kim et al. ................... 348/458

*Primary Examiner*—Michael H. Lee
*Attorney, Agent, or Firm*—Robert E. Bushnell, Esq.

[57] ABSTRACT

A resolution conversion apparatus for a display device which converts input image signals to image signals having different resolution is provided. The resolution conversion apparatus for a display device can increase or decrease the number of scanning lines by using interpolation function to prevent the non-linear distortion due to the nonuniform insertion of scanning lines. The resolution conversion apparatus for a display device can also vary the interpolation function according to the frequency of image information to compensate the decrease of sharpness resulting from the conventional interpolation method using simple proportional values.

8 Claims, 3 Drawing Sheets

RESOLUTION CONVERSION APPARATUS AND METHOD FOR A DISPLAY DEVICE

CLAIM OF PRIORITY

This application makes reference to, incorporates the same herein, and claims all benefits accruing under 35 U.S.C §119 from an application entitled A Resolution Conversion Apparatus For A Display Device earlier filed in the Korean Industrial Property Office on Oct. 16, 1996, and there duly assigned Ser. No. 96-46292 by that Office.

BACKGROUND OF THE INVENTION

Field of the Invention

The present invention relates to a display device for displaying sequential input image data composed of video signals and synchronous signals, and more particularly to a resolution conversion apparatus and method for a display device which converts input image signals to image signals having a different resolution.

Description of the Related Arts

At present, display devices for displaying input signals composed of the combination of video signals (RGB color or Black & White) and synchronous signals use a method of increasing the number of scanning lines to improve the resolution of various modes (the combination of vertical/horizontal scanning frequency, abbr. mode) of input signals. Many methods are used for increasing the number of scanning lines and U.S. Pat. No. 3,830,971 to Leendert Johan van de Polder entitled Line Standard Converter For Converting A television Signal Having a number of N-Lines Per Image Into A Television Signal Having A Number Of M-Lines Per Image provides an early method for reducing the number of lines by one-half or doubling the number of lines, and several other examples are described below.

At first, referring to FIG. 1, a resolution conversion method using scanning line repetition is described. As shown in FIG. 1, N scanning lines are increased to (N+1) scanning lines by outputting the first scanning line twice and then outputting the remaining consecutive (N−1) scanning lines once. Or in other words, the number of input scanning lines are converted to 1.25 times the input number of scanning lines, e.g., four scanning lines are converted to five scanning lines. The above method is repeated for every four input scanning lines and resolution conversion is achieved as described above. Another method, as will be described referring to FIG. 2, is to interpolate with a predetermined proportion value as described in U.S. Pat. No. 3,970,776 to Koji Kinuhata et al. entitled System For Converting The Number Of Lines Of A Television Signal. As shown in FIG. 2, the scanning line to be output and the predetermined proportion values of its adjacent two scanning lines are output. For example, referring to FIG. 2, four scanning lines A, B, C and D are converted to five scanning lines E, F, G, H and I according to the following equations (1).

$$E = 1 \times A$$

$$F = \frac{3}{4} \times B + \frac{1}{4} \times A$$

$$G = \frac{2}{4} \times C + \frac{2}{4} \times B$$

-continued
$$H = \frac{1}{4} \times D + \frac{3}{4} \times C$$

$$I = \frac{4}{4} \times D$$

The above prior art methods for increasing the scanning lines have following disadvantages.

First, the disadvantage of the above described resolution conversion method using scanning line repetition is as follows. The local increase of the number of scanning lines results in nonlinear distortion of the image. For example, if a real image is composed of many horizontal lines having equal thickness, each horizontal line of the image after conversion has different thickness from one another.

Second, the method of interpolating with a predetermined proportion value has the following disadvantage. If new scanning lines are generated by applying linear proportion values to two adjacent scanning lines, an image for a photograph is smoothly extended, but if the method is applied to a text mode having many high frequency components in the vertical direction, sharpness is decreased. For example, the borderline of the image is blurred. Moreover, another problem is that such a method cannot be applied to the occasion of decreasing the number of scanning lines.

U.S. Pat. No. 3,742,135 to John Lewis Edwin Baldwin entitled Television Systems contemplates an interpolation method between adjacent lines of an original standard to an intermediate standard having either a reduced number of lines or an increased number of lines, wherein the interpolation coefficients are derived according to a phase relationship between sync pulses of the input and output standards and the sum of the coefficients equals unity.

SUMMARY OF THE INVENTION

It is therefore an object of the present invention to provide a resolution conversion apparatus and method for a display device which increases or decreases the number of scanning lines by using an interpolation function to prevent the nonlinear distortion due to the nonuniform insertion of scanning lines.

It is another object of the present invention to provide a resolution conversion apparatus and method for a display device which can vary the interpolation function according to the frequency of the image information to compensate for any decrease in sharpness resulting from the prior interpolation method using simple proportional values.

According to an aspect of the present invention to achieve the above described objects, a resolution conversion apparatus for a display device incorporates an interpolation portion receiving scanning lines and outputting interpolated scanning lines whose values are calculated by multiplying corresponding weighted values in response to interpolation control signals according to the indication of an interpolation function; a scanning line selection portion outputting only scanning lines selected from the interpolated scanning lines which are input in response to the input of switching control signals; a scanning line storage portion composed of a plurality of line buffers for storing the selected scanning lines in an indicated region by storage control signals synchronized with the input of a storage clock, and outputting the selected scanning lines stored in the indicated region in response to output control signals synchronized with the input of an output clock; and a control portion outputting the interpolation control signals by indicating an interpolation function, outputting the switching control signals for controlling switching order, and outputting the storage control signals, the output control signals, the storage clock and the output clock.

In the embodiment of the present invention, the interpolation portion can vary weighted values according to the frequency of the input image, the scanning line selection portion can select line buffers sequentially according to the interpolation proportion, the plurality of line buffers of the scanning line storage portion are made of ring type buffers to buffer the difference between the input speed and output speed, and the control portion is composed of a microcomputer or a digital signal processor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

A resolution conversion apparatus according to a preferred embodiment of the invention is described with reference to the accompanying drawings.

Figure 1:
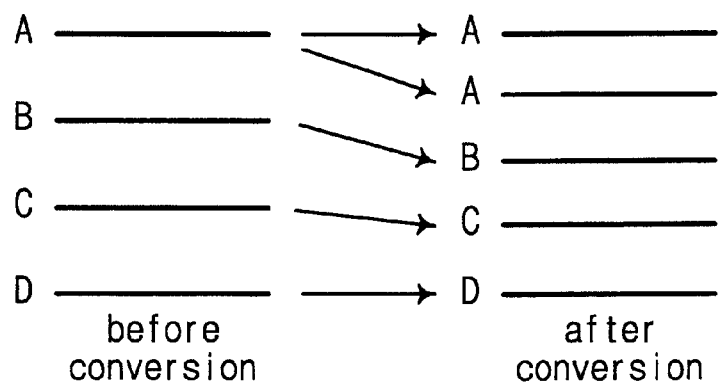
FIG. 1 is a view for explaining a resolution conversion method using scanning line repetition as an example of conventional resolution conversion method.
Figure 2:
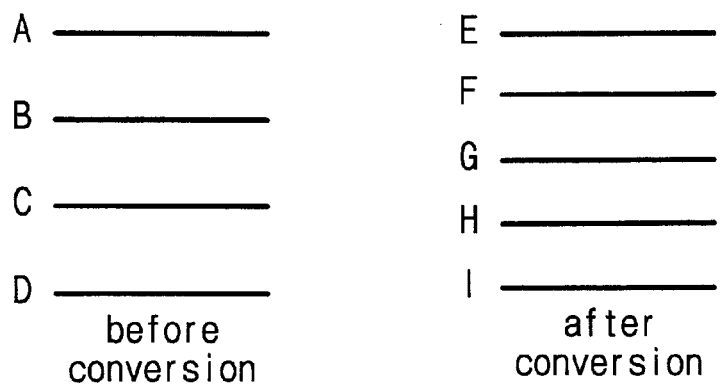
FIG. 2 is a view for explaining a resolution conversion method interpolating with predetermined values as another example of conventional resolution conversion method.
Figure 3:
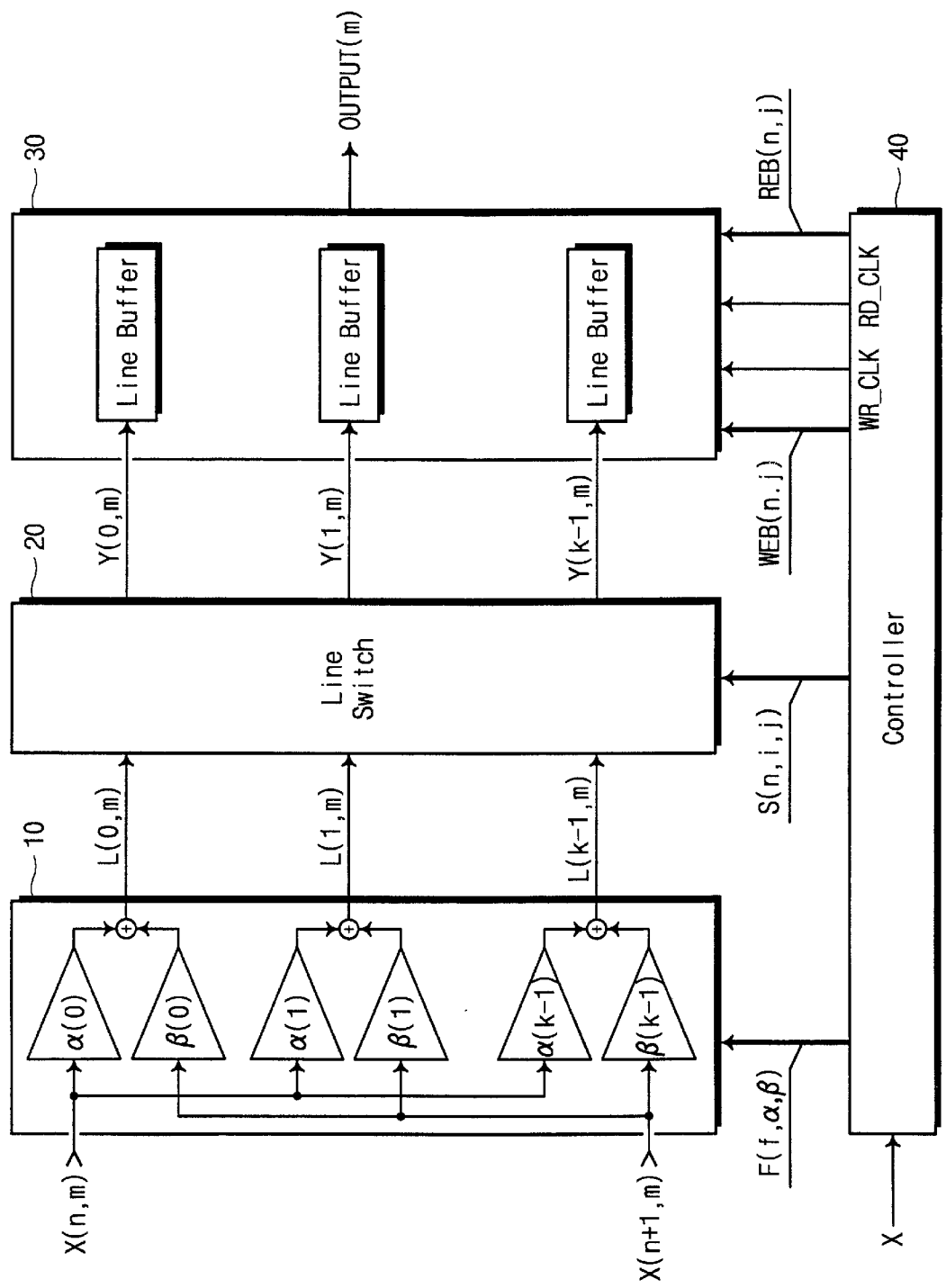
FIG. 3 is a view illustrating the circuit of resolution conversion apparatus according to the principles of the present invention.

Referring to FIG. 3, the resolution conversion apparatus of the present invention comprises an interpolation portion 10, a line switcher 20 as a scanning line selection portion, a scanning line storage portion 30 composed of a plurality of line buffers, and a control portion 40. The control portion 40 may be composed of a microcomputer or a DSP (Digital Signal Processor) which can process high frequency.

The interpolation portion 10 can represent all screen data according to the following equation (2):

$$SD = \sum_{n=0}^{N-1} \sum_{m=0}^{M-1} x(n, m)\delta(n, m)$$

Wherein, N represents the total number of scanning lines composing a screen, M representing the total number of data in each scanning line, and n is a vertical component index, and m is a horizontal component index. Among them, n-th scanning line X(n) and (n+1)-th scanning line X(n+1) can be represented according to the following equations (3):

$$X(n) = \sum_{m=0}^{M-1} x(n, m)\delta(n, m); \text{ and}$$

-continued
$$X(n+1) = \sum_{m=0}^{M-1} x(n+1, m)\delta(n+1, m)$$

The scanning lines X(n) and X(n+1) are input to interpolation portion 10 and are multiplied by weighted values in response to an interpolation control signal input from control portion 40, and resulting calculated scanning lines are output to line switch 20.

The scanning line X input to the interpolation portion 10 can be represented as X(n) and X(n+1) respectively, and the pixel value of n-th and (n+1)-th lines in horizontal position m can be represented as X(n, m) and X(n+1, m). The spatial frequency at the interpolation position is according to the following equation (4):

$$f=|X(n,m)-X(n+1,m)|$$

Interpolation function F(f, α, β) according to the spatial frequency is used. Here, the following equations are applied according to predetermined situations.

$$\text{Equations (5):} \quad \alpha(k) = \frac{1}{1 + e^{[-A(k-K/20)]}}$$
$$\beta(k) = 1 - \alpha(k)$$

$$\text{Equations (6)} \quad \alpha(k) = (k - K/2) + 0.5$$
$$\beta(k) = 1 - \alpha(k)$$

Here, A=$\mu$*f, wherein $\mu(\mu>0)$ is an arbitrary positive constant identifying the difference between two pixels with a constant A, K is the number of steps set for interpolation calculation between two scanning lines, where k=0, 1, 2, ..., k−1.

If the spatial frequency around the interpolation point is high equations (5) are applied, and if the spatial frequency around the interpolation point is low the equations (6) are applied.

Figure 4:
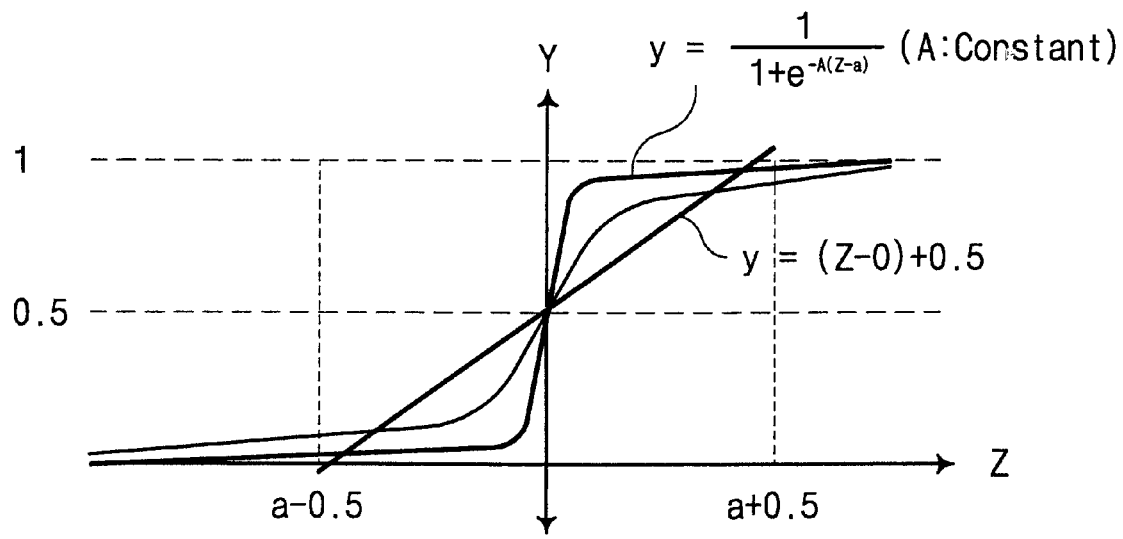
FIG. 4 is a graph for explaining the characteristic of the interpolation function.

FIG. 4 illustrates the characteristic curve of the interpolation function α(X). As illustrated in FIG. 4, the characteristic curve of the following equation (7) is varied according to the increase and decrease of value A (A is a constant), and it nears Y-axis as the value A increases.

$$y = \frac{1}{1 + e^{-A(Z-\alpha)}}$$

However, as the value A decreases, the curve changes its shape to a line type and the following equation (8) for the ideal line type is as follows:

$$y=(Z-\alpha)+0.5$$

Consequently, both low frequency image and high frequency image are easily dealt by adjusting the value A.

As described above, the output values interpolated by the interpolation function F(f, α, β) and output between m-th two values of two scanning lines X(n) and X(n+1) are L(I, m), wherein I=0, 1, ..., k−1 and k is the same to the number of interpolation result values between the two points.

Line switch 20 switches interpolated input scanning lines L in response to switching control signals S which is input from control portion 40 and outputs selected scanning lines Y to scanning line storage portion 30.

Scanning line storage portion 30 is controlled by the storage control signals WEB and the storage clock WR_CLK which are input from control portion 40 to store the selected scanning lines Y in the indicated line buffers. Thereafter, scanning line storage portion 30 is controlled by the output control signals REB and the output clock RD_CLK which are input from control portion 40 to output the scanning line data of the indicated line buffers.

In detail, L(i, m) is switched to Y(j, m) by switching function S(n, i, j) and they are stored in the line buffers indicated by storage control signals WEB(n, j) in response to the storage clock WR_CLK.

The values of the line buffers indicated by output control signals REB(n, j) are output as OUTPUT(m) in response to the output clock RD_CLK.

A plurality of input line buffers can be indicated according to the number of scanning lines to be interpolated.

Here, the number of input signal scanning lines means the number of horizontal scanning lines while one vertical scanning line is scanned. The switching function S(n, i, j) is a switching function for switching the i-th value to the j-th value among the interpolated values. WEB(n, j) is a function for indicating line buffers to store values, and REB(n, j) is a function for indicating line buffers to output values. The indication of the input line buffers and output line buffers is sequentially executed in response to the storage clock and the output clock.

As described above, the present invention takes following effects.

Since the interpolation method is different at each interpolation position in consideration of frequency, the non-linear distortion of the image can be minimized. If the simple interpolation method is applied to the high frequency input image, the dimness of the image may occur. However, according to the present invention, it can be minimized. Moreover, the number of scanning lines can be easily increased or reduced, and the interpolation for the whole screen can be executed without using a frame buffer.

While the invention has been described in terms of an exemplary embodiment, it is contemplated that it may be practiced as outlined above with modifications within the spirit and scope of the appended claims.

What is claimed is:

1. A resolution conversion apparatus for a display device comprising:
   an interpolation portion receiving scanning lines and outputting interpolated scanning lines whose values are calculated by multiplying corresponding weighted values in response to interpolation control signals according to an indicated interpolation function;
   a scanning line selection portion outputting only scanning lines selected from said interpolated scanning lines which are input in response to input switching control signals;
   a scanning line storage portion composed of a plurality of line buffers, and storing said selected scanning lines in an indicated region in response to storage control signals synchronized with an input storage clock, and outputting said selected scanning lines stored in the indicated region in response to output control signals synchronized with an applied output clock; and
   a control portion for outputting said interpolation control signals according to said indicated interpolation function, for outputting said switching control signals for controlling a switching order of said scanning line selection portion, for outputting said storage control signals, said output control signals, said storage clock and said output clock.

2. The resolution conversion apparatus for a display device as set forth in claim 1, wherein said interpolation portion has a function that can vary said weighted values according to a spatial frequency around an interpolation point.

3. The resolution conversion apparatus for a display device as set forth in claim 1, wherein said scanning line selection portion has a function that can select line buffers sequentially according to the interpolation proportion.

4. The resolution conversion apparatus for a display device as set forth in claim 1, wherein said plurality of line buffers of said scanning line storage portion are ring type buffers to buffer the difference between an input speed and an output speed of said selected scanning lines.

5. A method for convertion the resolution of an input signal for a display device, said method comprising the steps of:
   generating interpolated scanning lines by interpolating adjacent scanning lines input to an interpolation circuit by multiplying said scanning lines by weighted values in response to an interpolation control signal output from a control circuit according to an interpolation function;
   selectively providing selected ones of said interpolated scanning lines to a plurality of line buffers in response to a switching control signal output by said control circuit;
   storing said selected ones of said interpolated scanning lines in said line buffers in response to storage control signals output by said control circuit and in sync with a storage clock output by said control circuit; and
   outputting said selected ones of said interpolated scanning lines stored in said line buffers in response to output control signal output by said control circuit and in sync with an output clock output by said control circuit.

6. The method as set forth in claim 5, wherein said interpolation function is F(f, $\alpha$, $\beta$), where f a spatial frequency f=|(n,m)−X(n+1,m)|, X(n) and X(n+1) are said adjacent scanning lines, m represents a horizontla position in a scanning line, and $\alpha$ and $\beta$ are said weighted values.

7. The method as set forth in claim 6, wherein said weighted values $\alpha$ and $\beta$, when said spatial frequency is high, are determined by the following equations:

$$\alpha(k) = \frac{1}{1 + e^{[-A(k-K/20)]}}$$

$$\beta(k) = 1 - \alpha(k)$$

wherein A=$\mu$*f, such that $\mu(\mu>0)$ is an arbitrary positive constant identifying a difference between two pixels with a constant A, K is the number of steps set for interpolation calculation between said adjacent scanning lines, where k=0, 1, 2, . . . , k−1.

8. The method as set forth in claim 6, wherein said weighted values $\alpha$ and $\beta$, when said spatial frequency is low, are determined by the following equations:

$$\alpha(k)=(k-K/2)+0.5$$

$$\beta(k)=1-\alpha(k)$$

wherein K is the number of steps set for interpolation calculation between said adjacent scanning lines, where k=0, 1, 2, . . . , k−1.

* * * * *